US011297182B1

(12) United States Patent
Liu et al.

(10) Patent No.: US 11,297,182 B1
(45) Date of Patent: Apr. 5, 2022

(54) ANALYSIS OF CALL METRICS FOR CALL DIRECTION

(71) Applicant: 8x8, Inc., San Jose, CA (US)

(72) Inventors: Zhishen Liu, San Jose, CA (US); Qing Zhao, San Jose, CA (US); Bryan R. Martin, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 78 days.

(21) Appl. No.: 16/786,530

(22) Filed: Feb. 10, 2020

Related U.S. Application Data

(63) Continuation of application No. 16/545,776, filed on Aug. 20, 2019, now Pat. No. 10,560,580, which is a
(Continued)

(51) Int. Cl.
*H04M 7/00* (2006.01)
*H04L 12/26* (2006.01)
(Continued)

(52) U.S. Cl.
CPC ....... *H04M 3/5175* (2013.01); *H04M 3/2218* (2013.01); *H04M 3/2281* (2013.01);
(Continued)

(58) Field of Classification Search
None
See application file for complete search history.

(56) References Cited

U.S. PATENT DOCUMENTS

| 5,764,974 A | 6/1998 | Walster et al. |
| 5,794,239 A | 8/1998 | Walster et al. |

(Continued)

FOREIGN PATENT DOCUMENTS

| WO | 1996042041 A2 | 12/1996 |
| WO | 2008089522 A2 | 7/2008 |

OTHER PUBLICATIONS

International Telecommunications Union, SERIES P: Telephone Transmission Quality, Telephone Nstallations, Local Line Networks, ITU-T Recommendation p. 862, "Perceptual evaluation of speech quality (PESQ): An objective method for end-to-end speech quality assessment of narrow-band telephone networks and speech codecs," Feb. 2001.
(Continued)

*Primary Examiner* — Sai Aung
(74) *Attorney, Agent, or Firm* — Crawford Maunu PLLC

(57) ABSTRACT

Processing of communications routed by an IPBX server are disclosed. At least one processing circuit is communicatively coupled to an Internet-Protocol Private Branch Exchange (IPBX) server that is configured and arranged to route calls for a plurality of agents in a communications/call center. The processing circuit is configured to receive communications event messages from the IPBX server for communications routed by the IPBX server, generate, during a communication to a first agent of the plurality of agents, a set of data metrics including communications summary metrics based on the communications event messages; and redirect, during the communication to the first agent, the communication to a second agent of the plurality of agents in response to the set of data metrics satisfying a set of criteria indicated in a policy.

19 Claims, 5 Drawing Sheets

Related U.S. Application Data continuation of application No. 15/955,361, filed on Apr. 17, 2018, now Pat. No. 10,389,883, which is a continuation of application No. 14/859,073, filed on Sep. 18, 2015, now Pat. No. 9,955,021.

(51) Int. Cl.
*H04M 3/51* (2006.01)
*H04M 3/58* (2006.01)
*H04M 3/523* (2006.01)
*H04M 3/22* (2006.01)

(52) U.S. Cl.
CPC ........... *H04M 3/5232* (2013.01); *H04M 3/58* (2013.01); *H04M 7/009* (2013.01); *H04M 7/0084* (2013.01)

(56) References Cited

U.S. PATENT DOCUMENTS

| | | | |
|---|---|---|---|
| 6,760,324 B1 * | 7/2004 | Scott | H04L 45/02 370/352 |
| 6,782,080 B2 | 8/2004 | Leivo et al. | |
| 7,289,491 B2 | 10/2007 | Singh | |
| 7,647,041 B2 | 1/2010 | Gonsalves et al. | |
| 8,204,206 B2 | 6/2012 | Townsend | |
| 8,300,634 B2 | 10/2012 | Narayanaswamy | |
| 9,432,519 B1 | 8/2016 | Liu et al. | |
| 9,763,144 B2 | 9/2017 | LaBauve et al. | |
| 2002/0184575 A1 | 12/2002 | Landan | |
| 2004/0162781 A1 | 8/2004 | Searl et al. | |
| 2004/0208186 A1 | 10/2004 | Eichen et al. | |
| 2006/0062355 A1 | 3/2006 | Leonard | |
| 2007/0015535 A1 | 1/2007 | LaBauve et al. | |
| 2007/0025544 A1 | 2/2007 | Shaffer et al. | |
| 2008/0059158 A1 | 3/2008 | Matsuo et al. | |
| 2008/0109365 A1 | 5/2008 | Kulkarni et al. | |
| 2008/0118041 A1 | 5/2008 | Finogenov | |
| 2008/0159308 A1 | 7/2008 | Kimmitt et al. | |
| 2009/0144413 A1 | 6/2009 | Khan et al. | |
| 2009/0221265 A1 | 9/2009 | Liu et al. | |
| 2009/0245236 A1 * | 10/2009 | Scott | H04L 12/66 370/352 |
| 2010/0003969 A1 | 1/2010 | Isobe et al. | |
| 2010/0197288 A1 | 8/2010 | Camilleri et al. | |
| 2010/0203916 A1 | 8/2010 | Tiwari et al. | |
| 2011/0295712 A1 | 12/2011 | Browning et al. | |
| 2012/0303831 A1 | 11/2012 | Toshniwal et al. | |
| 2014/0314215 A1 * | 10/2014 | Duva | H04M 3/51 379/88.01 |
| 2015/0039351 A1 | 2/2015 | Bell et al. | |
| 2015/0213512 A1 * | 7/2015 | Spievak | H04M 3/4878 705/14.71 |
| 2015/0381820 A1 | 12/2015 | Ting et al. | |
| 2016/0063850 A1 | 3/2016 | Yang et al. | |
| 2016/0337441 A1 | 11/2016 | Bloomquist et al. | |

OTHER PUBLICATIONS

Radvision, "Back-To-Back User Agent (B2BUA) Sip Servers Powering Next Generation Networks: A Functional and Architectural Look At Back-To-Back User Agent (B2BUA) Sip Servers," 2007.
Gerry Blackwell, "Jajah: Free VoIP with a Twist," www.voipplanet.com (Oct. 5, 2006).
Jeff Goldman, "TalkPlus: a PBX for Mobil Phones," www.voipplanet.com (Aug. 16, 2007).

* cited by examiner

ANALYSIS OF CALL METRICS FOR CALL DIRECTION

OVERVIEW

A private branch exchange (PBX) routes calls between a service provider network (e.g., a cellular network or a public standard telephone network (PSTN)) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled devices on an IP network using VoIP, in which each device is assigned a respective telephone extension.

SUMMARY

Apparatuses and methods concerning routing of calls in an IPBX server are disclosed. As an example, an apparatus includes a first processing circuit communicatively coupled to an IPBX server configured and arranged to route VoIP calls for a plurality of agents in a call center. The end-users include a plurality of call center agents logically arranged in a hierarchy. The first processing circuit is configured to receive call event messages from the IPBX server for calls routed by the IPBX server. During a call to a first agent of the plurality of agents, the first processing circuit generates a set of data metrics based on the call event messages. The set of data metrics indicates, for example, real-time status of the call, of one or more participants of the call, of the IP network, or combinations thereof. As discussed herein, using real-time status of a call can allow for actions to be taken while the call is still in progress, as opposed to post-call analysis and statuses. Of course, a system can also be configured, in some embodiments, to use post-call analysis and statuses. The apparatus also includes a second processing circuit coupled to the first processing circuit. During the call to the first agent, the processing circuit directs the call to a second agent of the plurality of agents in response to the set of data metrics satisfying a set of criteria indicated in a policy.

As another example, an apparatus includes a first processing circuit communicatively coupled to a plurality of IPBX servers. Each IPBX server is configured to route VoIP calls for a respective plurality of end-users connected in a respective IP network. The first processing circuit is configured to receive call event messages from the IPBX servers for calls routed by the IPBX servers. For each of the IPBX servers, the first processing circuit is configured to generate a set of data metrics including call summary metrics based on the call event messages and in response to a call routed by the IPBX server. The apparatus includes a second processing circuit coupled to the first processing circuit. The second processing circuit is configured to send an alert message to a user indicated in a respective policy for the IPBX server in response to the set of data metrics generated for the call satisfying a set of criteria indicated in the policy.

A method is also disclosed for operating an IPBX. Using an IPBX server, VoIP calls are routed for a plurality of agents of a call center. During a call to a first agent of the plurality of agents, a set of data metrics including call summary metrics is generated based on call event messages generated by the IPBX server for the call. In response to the set of data metrics satisfying, during the call to the first agent, a first set of criteria indicated in a policy for the IPBX server the call is directed to a second agent of the plurality of agents. In response to the set of data metrics satisfying, during the call to the first agent, a second set of criteria indicated in the policy, an alert message is sent to a user indicated in the policy.

BRIEF DESCRIPTION OF THE FIGURES

The disclosure may be more completely understood in consideration of the following detailed description of various embodiments of the disclosure, in connection with the accompanying drawings in which.

Figure 1:
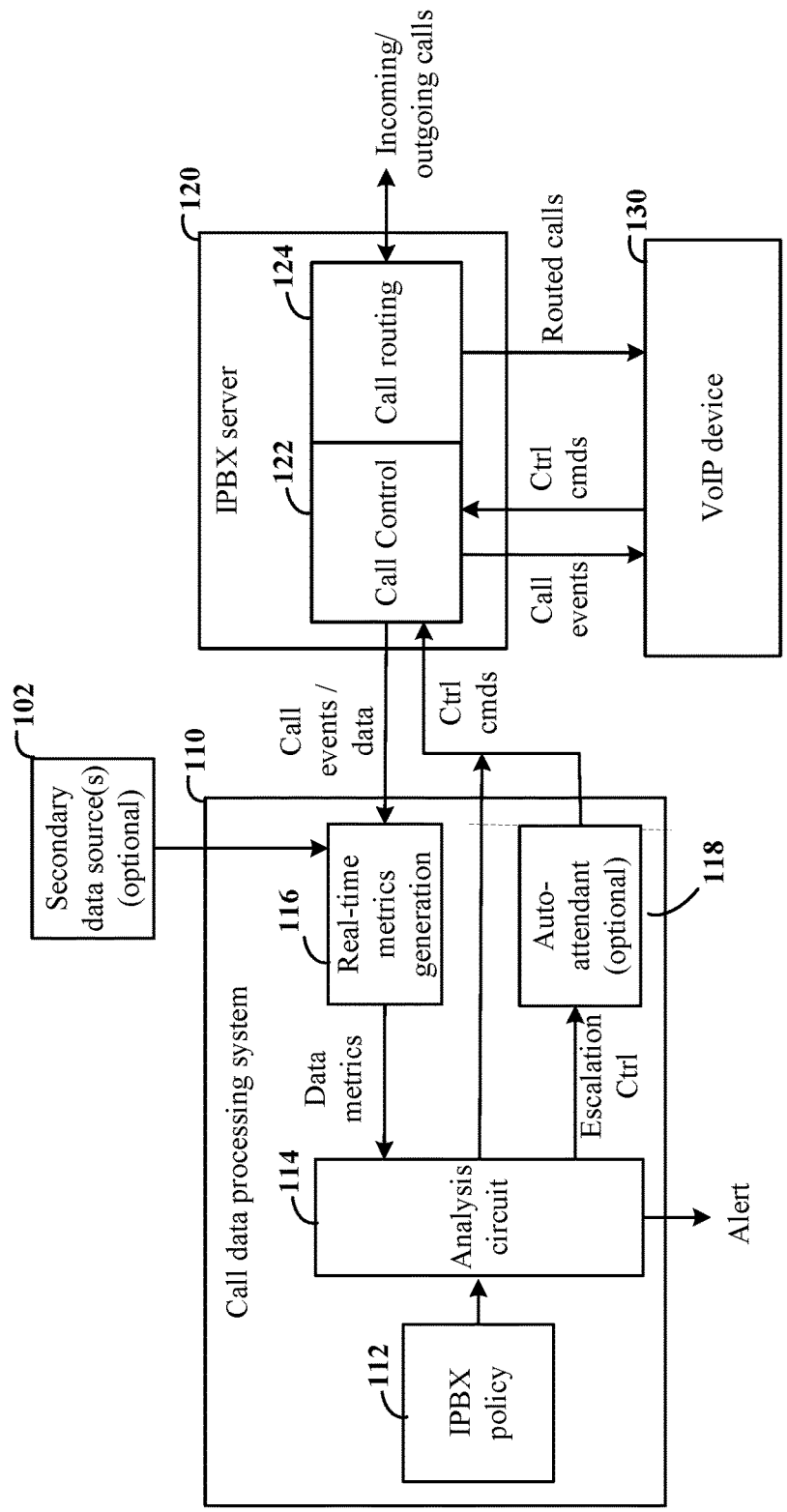
FIG. 1 shows an example communication system having an IPBX server and a call data processing circuit configured in accordance with one or more embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods utilizing an IPBX server to route calls for end-users connected in an IP network. While the disclosed embodiments are not necessarily limited to such applications, various aspects of the present disclosure may be appreciated through a discussion of various examples using this context.

In one or more embodiments, an apparatus includes a first processing circuit configured to generate respective set of data metrics including call summary metrics for calls routed by an IPBX based on call-related data including, for example, call event messages generated by the IPBX, audio data of the calls, and/or performance metrics (e.g., latency, throughput, packet loss, and/or bit error rate). The set of data metrics may indicate, for example, statuses of the call, of one or more participants of the call, and/or of the IP network, while the call is ongoing. For each call, the data metrics include call summary metrics that characterize various aspects of the call including, for example, a current number of participants, cumulative number of participants, total call time, and/or total on hold time. Additionally or alternatively, call summary metrics may indicate data for each call participant including, for example, a number of incoming calls, a number of outgoing calls, a number of answered calls, a number of missed calls, a number of abandoned calls, average call time, average time to answer, average on-hold time, or various combinations thereof.

In some implementations, the IPBX server generates call event messages to indicate changes in statuses of calls in the IPBX. Call event messages may include, for example, ring/alert, call connected, call disconnected, call on-hold, call parked, call reconnected, call transferred, and/or calls merged/conferenced. The call event messages may be provided to various end-users and/or applications in addition to end-users who are participants in a call. For example, the call event messages may by be used by an application to track and assess processing of incoming calls by a plurality of end-users in the IPBX. Incoming calls may be tracked for all end-users connected in an IPBX or only for a subset of end-users (e.g., in a particular department or call canter of interest).

In some embodiments, the call summary metrics may characterize various aspects relating to audio content of a call. For example, the first processing circuit may analyze audio data to identify words spoken by participants of the call and/or transcribe a conversion of the call. As another example, stress level of call participants may be quantified by performing voice stress analysis on audio content of the call. Voice stress analysis monitors a level of stress of a speaker based on fluctuations, referred to as microtremors, in an inaudible range in the speaker's voice.

In some implementations, the first processing circuit can be configured to generate data metrics based on various other event messages received from one or more secondary data sources including, for example, endpoint registration events (e.g., connectivity detection), extension status events (e.g., DND, Busy, or ON call), presence events, call quality events (e.g., indicating latency, throughput, number of dropped packets, average and/or number of bits in error), virtual meeting summary events, SMS events, and/or system alarm events (e.g., indicating call loop, high CPU load, or rogue media traffic). Secondary data sources may include, for example, network devices, applications utilized by the end-users in the IPBX, internet-connected data repositories, and/or third-party data subscription services.

The apparatus also includes a second processing circuit that is configured to evaluate the set of status data generated for a call routed by an IPBX server using a set of criteria specified in a respective policy for the IPBX server. The second processing circuit is configured to perform one or more actions specified in the policy for a particular set of criteria in response to data metrics satisfying the criteria. In different embodiments, the criteria may prompt the second processing circuit to perform various actions when satisfied by the status data.

For example, in some embodiments, the second processing circuit is configured to provide alert messages to one or more users in real-time during an ongoing call in response to the set of criteria being satisfied by the call summery metrics. As an illustrative example, an alert may be provided to a manager in a sales department when a call is received from a specific set of clients having a history of placing large purchase orders. As another example, an alert may be provided to a manager in a call center whenever a number of calls in queue exceed a threshold number (or threshold level) so additional call center agents may be tasked to receive calls from the queue. Additionally or alternatively, an alert may be provided to the manager in the call center (e.g., to review a call) in response to a call participant using one or more trigger words specified by the set of criteria or in response to voice stress analysis indicating high levels of stress in the call participant. As yet another example, an alert may be provided to network manager of an IP network for an IPBX server if status data indicates there is a connectivity problem in the IP network. Additionally or alternatively, an alert may be provided to the network manager based on quality of service metrics. In some implementations, the alert messages may include a mechanism for a recipient to select one or more actions to be performed. For instance, the alert can be a screen pop window that includes clickable options: to transfer a call to the manager (or another agent), to send an instant message to the agent currently on the call, to flag the call for follow-up, or other options.

As another example, the second processing circuit may be configured to redirect a call in the IPBX (e.g., in a call center) in response to data metrics for the call satisfying a set of criteria. In a call center, the system can be configured to arrange the call agents into a hierarchy of levels (e.g., automated menu process, service agents, group leaders, supervisors, department heads, etc.). Generally, calls to the call center are initially routed to the lowest level in the hierarchy. If a call cannot be handled by the automated process or call agent at a given level, the call may be directed to a call agent in a higher level of the hierarchy. For ease of reference, directing a call to a higher level call agent in a call center may be referred to as escalating the call. The second processing circuit may be configured to escalate a call in a call center in response to the real-time status of the call, of the call participants, and/or of the network satisfying a set of criteria specified in a policy for the IPBX server. In some implementations, the set of criteria may cause the second processing circuit to escalate a call from one call agent to a higher level call agent in response to a trigger word (e.g., supervisor, manager, or specific product name) being identified in the audio of the call. Additionally or alternatively, the second processing circuit may escalate the call in response to voice stress analysis indicating a stress level greater than a threshold stress level specified in a set of criteria. For example, the automated escalation may initiate transfer to a higher-level call agent by placing a second call to the higher level agent and merging the second call with the original call as a conference. In some implementations, an audible alert may be provided to participants of the call to announce that the higher-level call agent is added to the call. In some implementations, the second processing circuit may provide an audible summary of pertinent information (e.g., caller info and purpose of call) prior to merging the second call with the original call.

In some implementations, the second processing circuit is further configured to cross-correlate status data generated by the first processing circuit with a secondary data source to determine additional metrics for evaluation of one or more sets of criteria in the policy. Secondary data sources may include, for example, an IPBX directory, contact directories of individual end-users in an IPBX, non-voice messaging services (e.g., short message service (SMS), email, or instant messaging), internet-connected data repositories, and/or third-party data subscription services.

A set of criteria may specify a value or a range of values for one or more parameters indicated by the data metrics. In some implementations, a set of criteria may be specified as function using one or more of the parameters as inputs. In some implementations, the criteria may indicate respective weightings for a plurality of parameters. The criteria may be satisfied, for example, by a comparison of a cumulative value of a plurality of weighted parameter values to a threshold value.

The settings of a policy for an IPBX server (e.g., criteria for trigging alert messages, redirection of calls, or other actions) may be adjusted based on the particular requirements of the IPBX server. In some embodiments, the apparatus may include a processing circuit is configured to provide a graphical user interface (GUI) that may be used to adjust settings of the respective policy for each IPBX server coupled to the apparatus. Particular embodiments allow for a global adjustment that increases or decreases the relative trigger points without modifying the underlying weights of each criteria. For instance, a manager may decrease the global trigger point to reduce the number of calls (or alerts) that are escalated to the manager, or other individuals, when there is insufficient bandwidth by the manager (or the other individuals) to handle the number of calls or alerts. Similarly, the manager might increase the global trigger point to increase the involvement of the manager, or other individuals, in the calls. In certain embodiments, the system is configured to dynamically adjust the trigger level according to a target level of escalated calls. Generally speaking, the target level can be adjusted based upon the total call volume and an expected percentage of calls at different levels. For example, the desired number of calls can be represented by the value D, the total expected call volume is V and the percentage of calls above a trigger level x is determined by the function f(x). The value of x, for a particular volume of calls, can be roughly calculated by finding the value of x that satisfies V f(x)=D.

According to various embodiments, the system, and the associated GUI, can also be configured to allow for changes to the individual weight values. This can be particularly useful for changing the importance of various factors. As a non-limiting example, a sales manager may decide to increase the importance of caller's geographic location in order to target specific markets. The flexibility of this type of adjustment, as well as the ease in which it can be implemented, can be particularly useful simplifying the implementation of various marketing and sales plans.

In some embodiments, one or more sets of criteria may be determined using a machine learning algorithm (e.g., an evolutionary algorithm). The machine learning algorithm evaluate and adjusted a set of criteria in a training processes to create a set of criteria to improve performance and/or accuracy of algorithm. Training may include supervised learning, which manually assesses performance or selects modifications, or may include unsupervised learning, which automatically assesses performance of different variations of the criteria. In some implementations, the machine learning algorithm may be configured to continue to adjust the criteria during operation of the IPBX. For example, the second processing circuit may trigger call escalation and/or alert using a current set of criteria and also with one of more variations of the set of criteria. Future data metrics may be used to evaluate performance of the variations of the set of criteria may be compared to the current set of criteria to determine if any improvement is achieved. If a variation of the algorithm, outperforms the current algorithm for a threshold number of data sets, the variation may be selected to be used as the current algorithm. As an illustrative example, a machine learning algorithm determine a set of criteria to identify and escalate calls which have a high probability of resulting in a purchase order. Records of calls escalated by different variations of criteria may be cross-correlated with sales data to determine which variation of criteria provides the largest amount of sales.

Turning now to the figures, FIG. 1 shows an example communication system having an IPBX server configured in accordance with one or more embodiments. The IPBX server 120 includes a call routing circuit 124 configured to route VoIP calls for VoIP-enabled devices (e.g., 130) communicatively coupled to the IPBX server 120 via a network. Each of the VoIP enabled devices corresponds to a respective end-user or call receptionist in the IPBX.

The IPBX server 120 can include a call control circuit 122 configured to direct routing of calls by the call routing circuit 124, responsive to the VoIP-enabled devices 130. VoIP-enabled devices 130 communicate call control commands to the call control circuit 122 of the IPBX server 120 to prompt the call routing circuit 124 to perform various call-related actions selected by an end-user or receptionist. The call control circuit 122 can provide event messages to indicate changes in statuses of the pending calls to VoIP-enabled devices 130 of end-users who are active participants in the call.

The call event messages may be provided to various end-users and/or applications in addition to end-users who are participants in a call. For instance, in some implementations, an authorized user or application may initiate a subscription to monitor call events for specified end-users. In response to receiving a subscription request, the call control circuit 122 initiates a new subscription for the switchboard interface. While the subscription is active, the call control circuit 122 provides event messages to the subscriber to indicate changes in statuses of the calls for the end-users specified in the subscription.

A call data processing system 110 can include one or more (computer) processing circuit that are configured to carry out call processing functions. For instance, one or more computer processor circuits can be configured to carry out the specific functions described in connection with each of the depicted blocks, or a single computer processor circuit can be configured to do the same. As depicted, the call data processing system 110 may be configured to receive the call event messages generated by the IPBX server 120 for calls to or from the end-users. The call data processing system 110 can includes a first processing circuit or module (metrics generation circuit 116) configured to generate various data metrics from the call event messages received from the IPBX 120, audio data of the calls, and/or events received from secondary data sources 102 (e.g., network devices, applications utilized by the end-users in the IPBX, internet-connected data repositories, and/or third-party data subscription services). Events received from secondary data sources 102 may include, for example, endpoint registration events (e.g., connectivity detection), extension status events (e.g., DND, Busy, or ON call), presence events, call quality events (e.g., indicating latency, throughput, number of dropped packets, average and/or number of bits in error), virtual meeting summary events, SMS events, and/or system alarm events (e.g., indicating call loop, high CPU load, or rogue media traffic).

The metrics generation circuit 116 can be configured to generate data metrics in real-time. For example, real-time aspects can include generating and using call summary data metrics from call events while the call is ongoing. As previously discussed, the data metrics indicate various statistics characterizing real-time statuses of calls, of end-users, of an IP network, or combinations thereof. The metrics generation circuit 116 may utilize various processes to generate data metrics (e.g., data metrics) from received data. In some embodiments, the metrics generation circuit 116 may implement a processing engine (e.g., KAFKA) to consume various types of events (e.g., call events, address events, and/or status events) and generate data metrics. For example, the metrics generation circuit 116 may implement respective KAFKA event stream processes to consume and process different types of events. For further information regarding generation of data metrics and for other information, reference may be made to U.S. application Ser. No. 14/725,878, entitled "MODELING AND ANALYSIS OF CALLS IN IPBX", which is fully incorporated by reference herein.

The call data processing system 110 can also include a second processing circuit or module (analysis circuit 114) configured to evaluate the data metrics for one or more sets of criteria specified and perform various actions in response to a set of criteria being satisfied as previously described. For example, the analysis circuit 114 may be configured to provide an alert message to one or more end-users in response to a set of criteria being satisfied by the data metrics. Criteria may be configured, by an authorized user, to cause the analysis circuit 114 to provide an alert message to a user when data metrics indicate a particular scenario occurs.

Alert messages may be provided using a number of different types of messages. For instance, in some implementations the processing circuit is configured to provide a screen pop window when a network administrator is logged into the system, and otherwise send an SMS text message notification to one or more telephone numbers indicated in the set of criteria. In some implementations, the processing circuit is configured to send an automated voice call to the telephone number(s). In some embodiments, the processing circuit is configured to send an email notification to an email address specified by the set of criteria. In some embodiments, alert messages are provided using other messaging services (e.g., Facebook, MySpace, Twitter, and/or Instant Messengers). In some implementations, alert messages are sent to multiple recipients and/or use multiple types of messages.

In some implementations, an alert message to a user may include a mechanism for the user to select one or more actions. For example, an alert message may include an option to forward the call to the recipient of the alert message, specify an end-user in the IPBX to forward the call to, adjust settings of network devices in the IP network (e.g., to remedy connectivity problems), and/or save a recording or transcript of the call for later review. In one implementation, an alert message may include a web address link to a webpage from which a recipient may select an action to take. In another implementation, a user may select a desired action by responding to an SMS or email alert message with a text indicating the selected action.

According to various embodiments, the analysis circuit 114 can be configured to analyze the metrics according to different sets of criteria and to apply different responses for the different sets. For example, a first set of criteria might emphasize (e.g., through weighting of the criterial and associated variables being monitored) call quality metrics. It is recognized in connection with embodiments discussed herein that poor call quality can significantly reduce the satisfaction of callers. Accordingly, if the call quality metrics suggest a poor call quality, and alert can be generated to indicate that a call should be transferred to a call agent located in a different geographic location. In particular, the call can be transferred to a geographic location selected based upon proximity to the caller, has favorable call summary statistics at the present time, other considerations, and various combinations thereof.

As discussed herein, the analysis circuit 114 can be configured to monitor the content of the call including, for example, monitoring stress levels and spoken words. The analysis circuit 114 can use the monitored information from different sources to provide a more accurate assessment of the call status. For example, analysis circuit 114 that is configured to determine that the stress level of a caller is high, can also be configured to determine a likely source of the stress. The analysis circuit 114 can then select from an appropriate set of responses, alerts, and actions. In a particular example, the analysis circuit 114 can generate a probability vector for a set of stress sources in order to ascertain the most likely cause(s) of an increased stress level. For instance, if the analysis circuit 114 detects significantly poor call quality (e.g., excessive packet loss, jitter or delay), the probability score for this element of the probability vector can be set to a relatively high value. Moreover, if the analysis circuit 114 detects that the caller is repeatedly asking the call agent to repeat themselves (as can be determined from analysis of the call audio content), then the probability score for this element of the probability vector can be further increased.

Consistent with some embodiments, the analysis circuit 114 can be configured to monitor for a change (delta) in stress level during an ongoing call and then use the delta in the stress level as part of the calculating the probability vector. For instance, if a stress level is high from the beginning of a call, the analysis circuit 114 would detect the high stress level but also detect that the delta is small (e.g., the stress level did not change during the call). The analysis circuit 114 can thereby be configured to set probability levels high for causes associated with preexisting factors, as opposed to factors occurring during the ongoing call. The converse could be true if there was a high delta value, suggesting that the stress level may be caused by something that occurred during the call. Moreover, the analysis circuit 114 can be configured to detect a negative delta (stress level is decreasing). A negative delta might indicate that the call agent is handling the call well, e.g., by satisfying the caller's needs. Thus, even if the stress level remains relatively high, the fact that the stress level is decreasing can be taken into consideration by lowering the corresponding trigger level for taking action (e.g., alerts or call transfers). Various embodiments are directed toward the use of a call flow history as part of the data metrics. This call flow history can indicating where the call originated, where it was transferred, which agents joined and left the call (e.g., through a transfer or multi-party conferencing), the length of that each different call segment is active, past calls from the same individual or number, and combinations thereof. The call flow history can then be compared to various call-flow history profiles to identify candidates for different responses. As a non-limiting example, the analysis circuit 114 might monitor for calls that match a first call profile where there is a long duration associated with a caller that is indicated as a potential new-account. This might suggest that the caller is interested in hearing about various additional options, confused about the options, or otherwise interested in having additional sales related assistance. Thus, if this call profile is matched to a particular call, the analysis circuit 114 could trigger an action for escalation with an appropriately-trained sales agent. Another example profile might relate to callers with existing accounts. For instance, if the data metrics for a call to technical support matches a profile that indicates that the caller may be dissatisfied, the call could be escalated to a higher level technical support individual, an alert could be provided to the same individual, or both an escalation and alert could be implemented.

In some embodiments, the analysis circuit 114 may be configured to direct calls to specific end-users or groups of end-users in response to a set of criteria being satisfied by the data metrics generated for the call. As an illustrative example, the analysis circuit 114 may dynamically direct calls in a call center based on real-time status of the call, of the call participants, and/or of the IP network. The analysis circuit 114 may be configured to escalate a call in a call center in response to the real-time status of the call, of the call participants, and/or of the network satisfying a set of criteria specified in a policy 112 for the IPBX server 120. In some implementations, the analysis circuit 114 may escalate the call by prompting the IPBX server 120 to redirect the call to a higher level call agent (e.g., via a control message). In some other implementations, the analysis circuit 114 may escalate the call by prompting a call agent currently participating in the call to transfer the call to a higher-level agent.

In some implementations, a set of criteria may cause the analysis circuit 114 to escalate a call from one call agent to a higher level call agent in response to a trigger word (e.g., supervisor, manager, or specific product name) being identified in the audio of the call. Additionally or alternatively, the analysis circuit 114 may escalate the call in response to voice stress analysis indicating a stress level greater than a threshold stress level specified in a set of criteria.

In some implementations, a set of criteria in the policy 112 may cause the analysis circuit 114 to automatically escalate a call to a higher level call agent when the call is initially placed to the call center before the call has been routed to a call agent. For example, a set of criteria in the policy 112 for an IPBX may be configured to identify high priority callers, for which calls should be initially escalated to a higher level call agent in the call center by the analysis circuit 114. For instance, the set of criteria may specify a list of callers that are considered to be high priority. The list may include, for example, numbers for purchasing agents for repeat customers or numbers indicated in a database of sales leads. The set of criteria may list high priority callers directly and/or may specify one or more databases at which high priority callers are listed. The set of criteria may direct the analysis circuit 114 to escalate calls to specific departments, a specific hierarchical level in a call center, and/or to specific call agents or end-users in the IPBX.

In some embodiments, high-priority callers to be escalated may be specified in a global policy for an IPBX server. In some implementations, the global policy may be manually specified by an authorized user. For example, a sales manager or individual sales agents may manually add numbers for customers, purchasing agents, or prospective clients for which calls should be automatically escalated. Additionally or alternatively, the analysis circuit 114 may be configured to automatically determine and add high priority callers to a set of criteria based on data metrics and/or secondary data sources. For example, in some implementations, an automated function may add a number of a caller to a list of callers to be escalated if the call results in a purchase order.

In some embodiments, the apparatus includes a third processing circuit (auto attendant circuit 118) is configured to provide an automated call menu. The automated call menu provides a menu map including one or more menus of options that can be navigated by a caller to select a destination to route the call or perform various actions. A user may navigate between individual menus of a menu map by selecting different ones of the options presented in the menus. The automated call menu may operate as the lowest hierarchical level in a call center. In some implementations, the analysis circuit 114 may be configured to escalate calls from the automated call menu to a call agent based on real-time status of the call, of the caller, and/or of the IP network as previously described.

Additionally or alternatively, the analysis circuit 114 may adjust options provided to a caller by the automated call menu based on real-time status of the call, of the caller, and/or of the IP network. For instance, the auto attendant circuit 118 may be configured to provide an automated call menu with a first menu map by default. In response to a set of criteria being satisfied for a caller in the automated call menu, the analysis circuit 114 may prompt the auto attendant circuit 118 to provide an automated call menu with a second menu map. For example, for some high priority callers identified by a set of criteria, the automated call menu may be adjusted to use a menu map having an option that is not included in a default menu map (e.g., to immediately transfer to a call agent).

In some implementations, the analysis circuit 114 is further configured to cross-correlate status data generated by the metrics generation circuit 116 with a secondary data source to determine additional metrics for evaluation of one or more sets of criteria in the policy 112. Secondary data sources may include, for example, an IPBX directory, contract directories of individual end-users in an IPBX, non-voice messaging services (e.g., short message service (SMS), email, or instant messaging), internet-connected data repositories, and/or third-party data subscription services.

Figure 2:
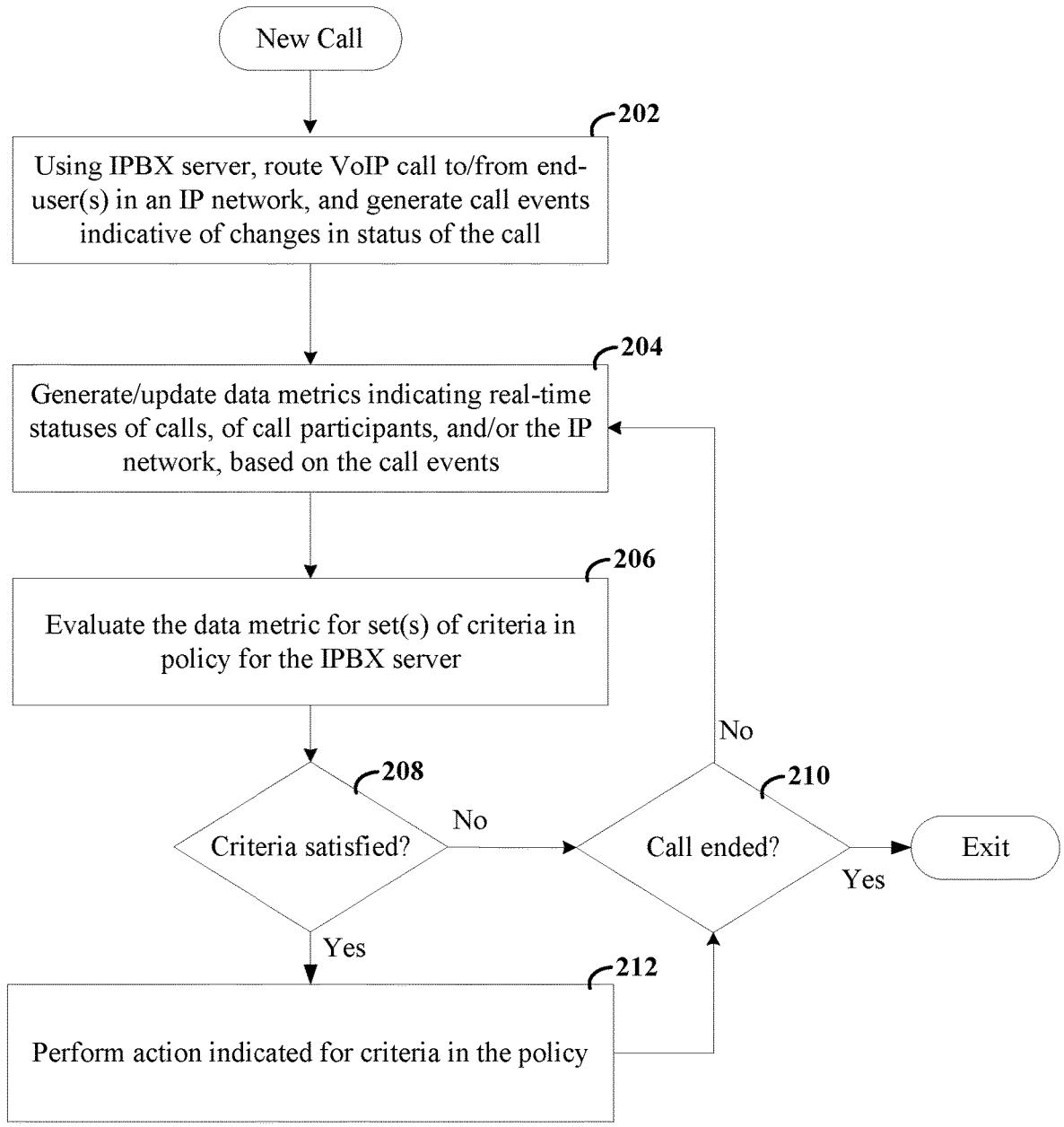
FIG. 2 shows an example process for operating an IPBX, consistent with one or more embodiments of the present disclosure.

FIG. 2 shows an example process for operating an IPBX, consistent with one or more embodiments of the present disclosure. At block 202, a VoIP call is routed to and/or from one or more end-users in an IP network. VoIP calls may be routed, for example, using IPBX server 120 in FIG. 1. Call events indicative of changes in status of routed calls are also generated at block 202. At block 204, data metrics are generated based at least in part on the call events. Data metrics may be generated, for example, by the metrics generation circuit 116. In some implementations, the generation of the data metrics may also be based on other data parameters that are monitored in an IPBX network or received from secondary data sources. For example, the data metrics characterize audio content (e.g., identify spoken words or quantify stress levels), or quality of service metrics for the call (e.g., latency, throughput, number of dropped packets, average and/or number of bits in error). While a call is ongoing, data metrics are evaluated at block 206 for sets of criteria indicated in a policy for the IPBX server. Data metrics may be evaluated using, for example, analysis circuit 114 in FIG. 1. If a set of criteria is satisfied, decision block 208 directs the process to block 212. At block 212, the process performs one or more actions specified for the satisfied set of criteria in the policy for the IPBX server. As previously described, actions may include, for example, providing an alert message to one or more end-users or escalating calls in a call center. After performing the action(s) at block 212, or if a set of criteria is not satisfied at block 208, the process proceeds to decision block 210. If the call has not ended, decision block 210 directs the process back to block 204, where the data metrics are updated. The process repeats in this manner until the call is ended, and decision block 210 directs the process to exit.

Figure 3:
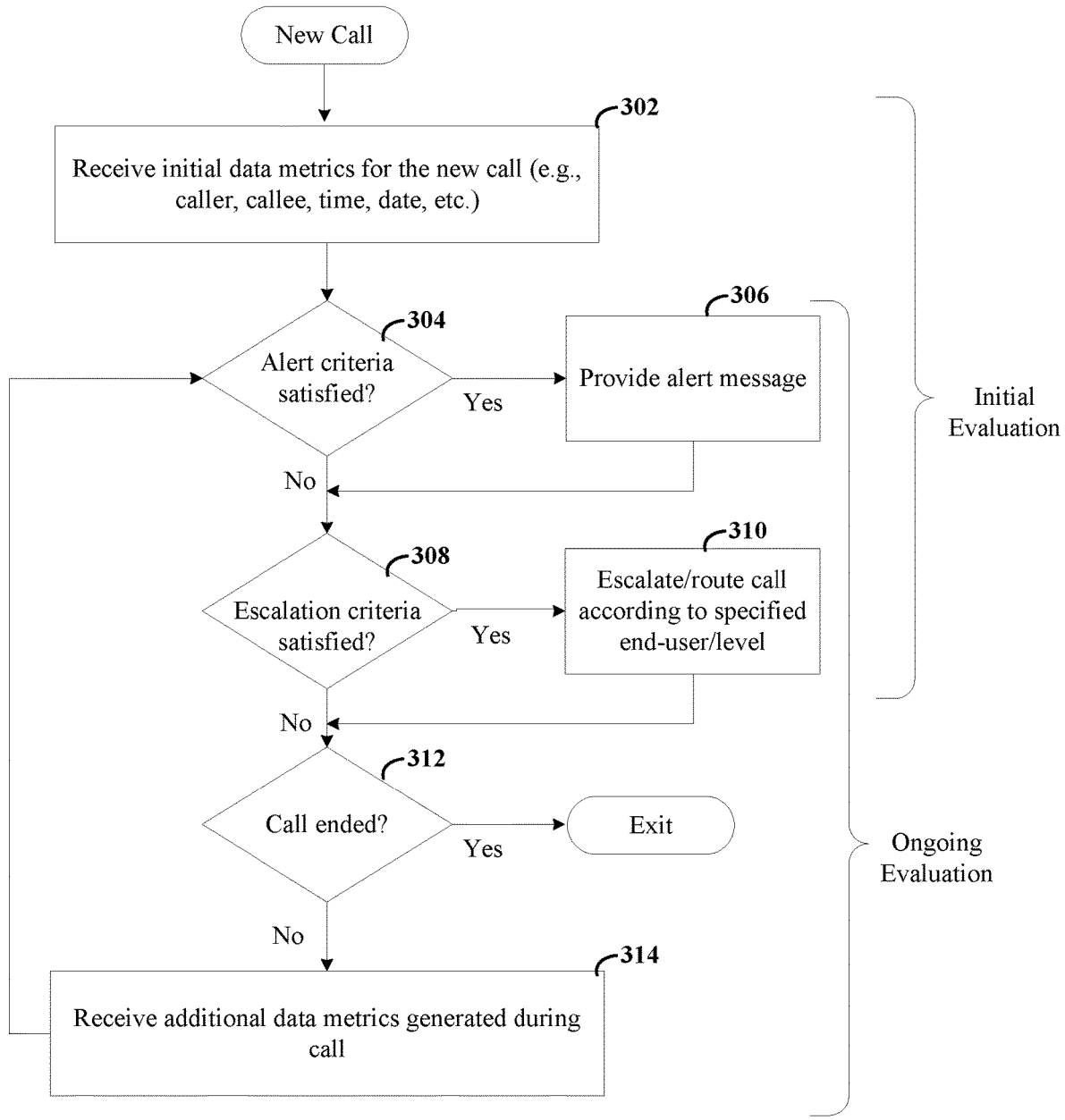
FIG. 3 shows an example process for evaluating data metrics for a call routed in an IPBX, consistent with one or more embodiments of the present disclosure.

In different implementations, criteria in a policy for an IPBX may trigger actions (e.g., alerts and/or call escalation) based on various data metrics that may be generated at various times during an ongoing call. FIG. 3 shows an example process for evaluating data metrics for a call routed in an IPBX. At block 302, initial data metrics are received for a new call routed by an IPBX server. The initial data metrics may characterize various aspects ascertainable at the beginning of the call including, for example, identity of the caller or callee, geographic location of the caller or callee, time and/or date of the call, and/or connectivity of the caller or callee (e.g., LTE, 3G, and/or WiFi). If the initial data metrics satisfy a set of alert criteria specified in a policy for the IPBX, decision block 304 directs the process to provide an alert message to one or more users specified by the set of alert criteria at block 306. Otherwise, the process proceeds to decision block 308. If the initial data metrics satisfy a set of escalation criteria specified in the policy, decision block 308 directs the process to escalate the call to a call agent or representative in a higher level of the hierarchy of the call center at block 310. Otherwise, the process proceeds to decision block 312. While the call is ongoing, decision block 312 directs the process to block 314.

At block 314, additional data metrics generated during the call are received and/or initial data metrics are updated. Additional data metrics may include, for example, data characterizing, total call duration, hold time, current number of call participants, cumulative number of call participants, call quality of service metrics (e.g., latency, throughput, number of dropped packets, average and/or number of bits in error), voice recognition data (e.g., spoken words and/or stress levels of participants), and/or presence or connectivity of end-users in an IP network. If the additional/updated data metrics satisfy the set of alert criteria, decision block 304 directs the process to provide the alert message to one or more users specified by the set of alert criteria at block 306. Otherwise, the process proceeds to decision block 308. If the additional/updated data metrics satisfy the set of escalation criteria, decision block 308 directs the process to escalate the call to a call agent or representative in a higher level in the hierarchy of the call center at block 310. Otherwise, the process proceeds again to decision block 312. The process proceeds in this manner until the call is ended.

Figure 4:
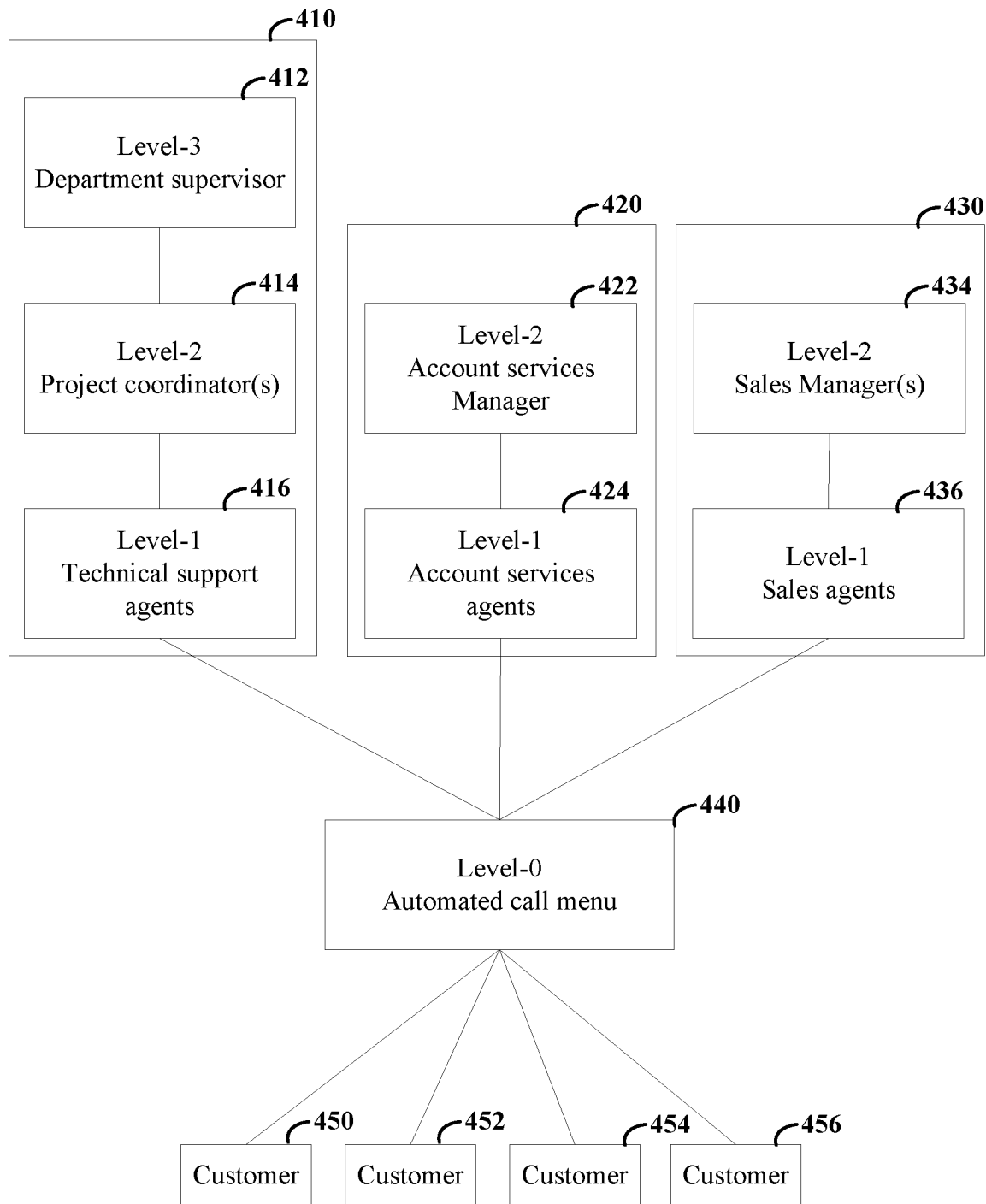
FIG. 4 shows an example call center hierarchy, consistent with one or more embodiments of the present disclosure.

FIG. 4 shows an example call center hierarchy, consistent with one or more embodiments. In this example, the call center hierarchy includes an automated call menu 440 in a lowest hierarchical level. The automated call menu 440 is configured to direct incoming calls from customers 450, 452, 454, and 456 in the IPBX according to input selections from the callers. In this example, the automated call menu 440 is configured to direct incoming calls to call agents in a call center having three different departments including a technical support department 410, an account services department 420, and a sales department 430. However, the automated call menu 440 may be adapted to direct calls in a call center having more or fewer departments. Each of the departments includes respective agents/representatives arranged within one or more levels of the call center hierarchy. In this example, the technical support department 410 includes call agents 416 in a first level, one or more project coordinators 414 in a second level, and a department supervisor 412 in a third level. The customer services department 420 includes call agents 424 in a first level and one or more managers 422 in a second level. The sales department 430 includes call agents 436 in a first level and one or more mangers 434 in a second level. In various implementations, the call center may be adapted to include additional or fewer departments having agents/representatives arranged into more or fewer levels than those shown in FIG. 4.

When an incoming call is initially directed to the technical support department 410, via the automated call menu 440, the call is routed by default to call agents 416, 424, or 436 located in the first level (i.e., level 1) of the department 410, 420, or 430. If call agents in the first level are unable to address a problem of the caller, the call agent may elect to escalate the call to a representative/agent in a second level (i.e., level 2) in the department that is higher than the first level. Additionally or alternatively, the call agent may elect to transfer a call to a call agent different department that is better suited to address the problem of the caller.

As previously discussed, a processing circuit (e.g., analysis circuit 114) may be configured to prompt the IPBX server to escalate a call in response to data metrics satisfying a set of criteria. In some implementations, a set of criteria may be used to trigger escalation or transfer of calls and/or generation of alert for all departments and levels in a call center hierarchy or only may be used for triggering. Additionally or alternatively, a set of criteria may only be used to trigger escalation and/or alert for some departments or levels in a call center hierarchy. For example, each department may use respective sets of criteria to determine whether to alert a manager or supervisor. As another example, a first set of criteria may be used to trigger escalation of calls from a first level in a department to a second level and a second set of criteria may be used to trigger escalation of calls from the second level to a third level.

Figure 5:
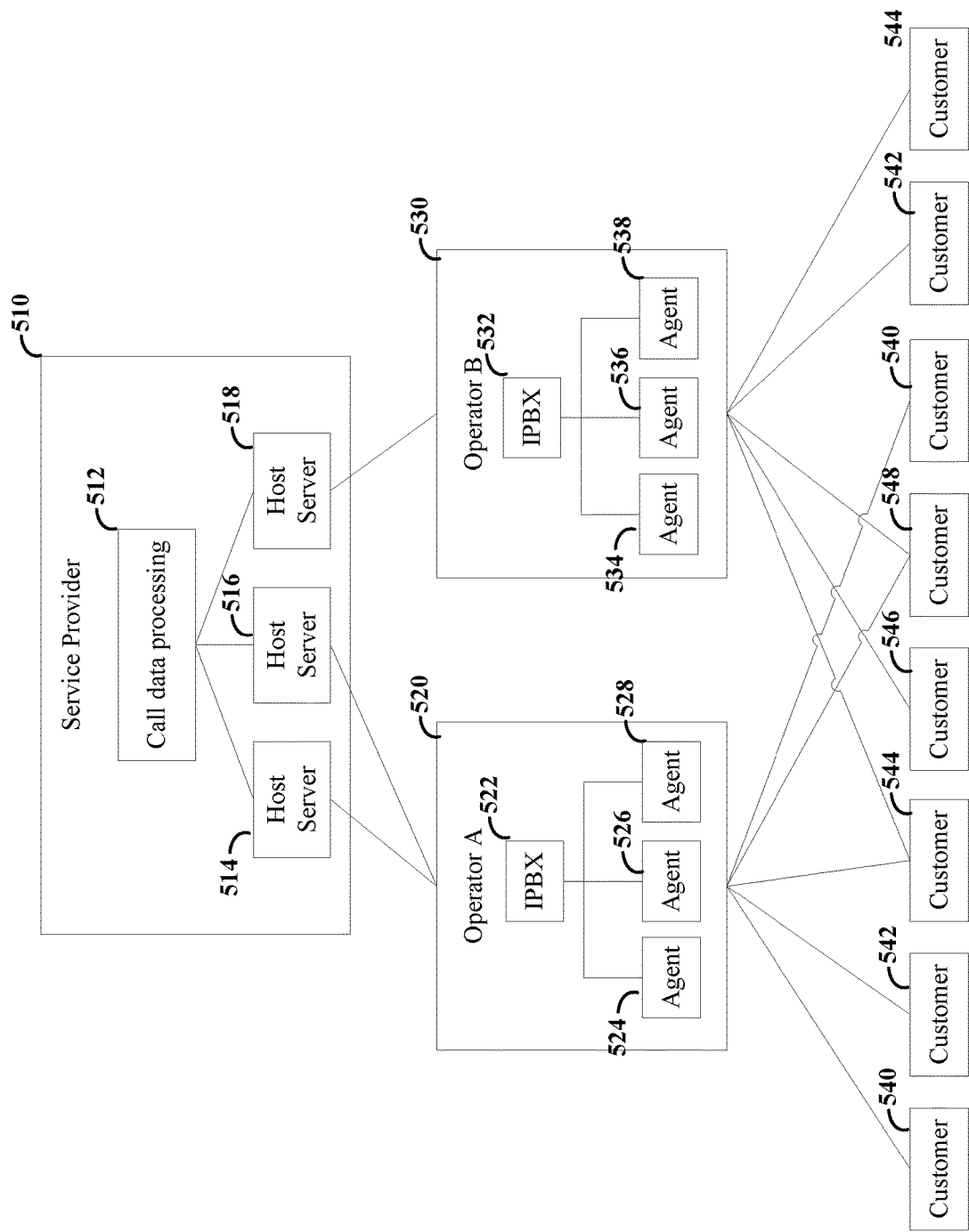
FIG. 5 shows an example hierarchy of a service provider, organizations, and customers, consistent with one or more embodiments of the present disclosure.

In some embodiments, a call data processing circuit may be configured to evaluate data metrics, as described above, in a plurality of IPBXs. FIG. 5 shows an example communication network including a VoIP service provider configured to provide respective IPBXs for a plurality of organizations. The organizations 520 and 530 provide respective products and/or services for various third-party customers 540, 542, 544, 546, 548, 550, 552, and 554. The VoIP service provider 510 includes a number of host servers 514, 516, and 518 configured to provide a respective IPBX server 522 and 532 for each organization 520 and 530. The IPBXs 522 and 532 are configured to route calls for a plurality of end-users 524, 526, 528, 534, 536, and 538 connected to the IPBX. In certain embodiments, the end-users can be call agents for a call center. For instance, IPBX servers 522 and 532 route calls from between the call agents 524, 526, 528, 534, 536, and 538 and the third-party customers 540, 542, 544, 546, 548, 550, 552, and 554 of the organizations 520 and 530.

The service provider 510 also includes a call data processing circuit 512 configured to monitor the IPBX servers 522 and 532 provided by the host servers 514, 516, and 518 for the organizations 520 and 530. As described with reference to the call data processing circuit 110 in FIG. 1, the call data processing circuit 512 is configured to generate data metrics in response to the call event messages generated by the IPBX servers. For each IPBX server 522 and 532, the call data processing circuit 512 is configured to evaluate the generated data metrics for one or more sets of criteria indicated in a respective policy for the IPBX server. As previously described, in response to a set of criteria being satisfied, the call data processing circuit 512 performs an action specified for the set of criteria in the policy for the IPBX server.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain above-discussed embodiments, one or more modules are discrete logic circuits or programmable logic circuits configured and arranged for implementing these operations/activities, as in the blocks shown in FIGS. 1 through 5. Similarly, it will be apparent that a server (e.g., providing a corresponding software platform), includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus comprising:
a data-communications computer server arrangement including a plurality of servers and a first processing circuit communicatively coupled to the plurality of servers, the data-communications computer server arrangement to route data for a plurality of respective Internet Protocol (IP)-enabled devices, each of the IP-enabled devices including circuitry to enable communication over the Internet for an end user of the IP-enabled device and to be communicatively connected in an IP communication network, wherein the first processing circuit is to:
 receive call event messages from the server for calls routed by the server; and
 generate, in response to a call routed by the server, a set of data metrics including call summary metrics based on the call event messages received from the server;
a second processing circuit, being communicatively coupled to or arranged as part of the data-communications computer server arrangement, to evaluate the generated set of data metrics using a set of criteria specified in a respective policy for the server and based on at least one of real-time status of the call and of the caller, to carry out at least one of the following actions: escalate calls from an automated call menu, and adjust options provided to the caller by the automated call menu; and
a third processing circuit, being communicatively coupled to or arranged as part of the data-communications computer server arrangement, to provide the automated call menu including caller options, wherein the automated call menu corresponds to a menu map having caller-navigable options from which a destination may be selected to route the call or perform various actions.

2. The apparatus of claim 1, wherein the second processing circuit is further configured to escalate calls from the automated call menu based on at least one of real-time status of the call and of the caller.

3. An apparatus, comprising:
a data-communications computer server arrangement including a plurality of servers and a first processing circuit communicatively coupled to the plurality of servers, the data-communications computer server arrangement to route data for a plurality of respective Internet Protocol (IP)-enabled devices, each of the IP-enabled devices including circuitry to enable communication over the Internet for an end user of the IP-enabled device and to be communicatively connected in an IP communication network, wherein the first processing circuit is to:
 receive call event messages from the server for calls routed by the server; and
 generate, in response to a call routed by the server, a set of data metrics including call summary metrics based on the call event messages received from the server;
a second processing circuit, being communicatively coupled to or arranged as part of the data-communications computer server arrangement, to evaluate the generated set of data metrics using a set of criteria specified in a respective policy for the server; and
a third processing circuit, being communicatively coupled to or arranged as part of the data-communications computer server arrangement, to provide an automated call menu including caller options, wherein the automated call menu corresponds to a menu map having caller-navigable options from which a destination may be selected to route the call or perform various actions, and wherein the one or more menus of options are navigable by the caller to select a destination to route the call, and wherein the one or more menus of options are navigable by the caller to select from various actions.

4. An apparatus, comprising:
a data-communications computer server arrangement including a plurality of servers and a first processing circuit communicatively coupled to the plurality of servers, the data-communications computer server arrangement to route data for a plurality of respective Internet Protocol (IP)-enabled devices, each of the IP-enabled devices including circuitry to enable communication over the Internet for an end user of the IP-enabled device and to be communicatively connected in an IP communication network, wherein the first processing circuit is to:
 receive call event messages from the server for calls routed by the server; and
 generate, in response to a call routed by the server, a set of data metrics including call summary metrics based on the call event messages received from the server;
a second processing circuit, being communicatively coupled to or arranged as part of the data-communications computer server arrangement, to evaluate the generated set of data metrics using a set of criteria specified in a respective policy for the server; and
a third processing circuit, being communicatively coupled to or arranged as part of the data-communications computer server arrangement, to provide an automated call menu including caller options, wherein the automated call menu corresponds to a menu map having caller-navigable options from which a destination may be selected to route the call or perform various actions, wherein the second processing circuit is further configured to provide the automated call menu including a first menu map for a call center.

5. The apparatus of claim 4, wherein the second processing circuit is further configured to update the automated call menu with a second menu map as indicated in the policy.

6. The apparatus of claim 1, wherein the second processing circuit is further configured to adjust options provided to the caller by the automated call menu based on at least one of real-time status of the call, of the caller and of the network.

7. An apparatus, comprising:
a data-communications computer server arrangement including a plurality of servers and a first processing circuit communicatively coupled to the plurality of servers, the data-communications computer server arrangement to route data for a plurality of respective Internet Protocol (IP)-enabled devices, each of the IP-enabled devices including circuitry to enable communication over the Internet for an end user of the IP-enabled device and to be communicatively connected in an IP communication network, wherein the first processing circuit is to:
receive call event messages from the server for calls routed by the server; and
generate, in response to a call routed by the server, a set of data metrics including call summary metrics based on the call event messages received from the server;
a second processing circuit, being communicatively coupled to or arranged as part of the data-communications computer server arrangement, to evaluate the generated set of data metrics using a set of criteria specified in a respective policy for the server; and
a third processing circuit, being communicatively coupled to or arranged as part of the data-communications computer server arrangement, to provide an automated call menu including caller options, wherein the automated call menu corresponds to a menu map having caller-navigable options from which a destination may be selected to route the call or perform various actions, wherein for at least one of the plurality of servers:
a hierarchy associated with communications processed by the server arrangement is specified in the policy; and
the automated call menu is configured to direct calls, using the hierarchy, from a plurality of customers to a plurality of agents.

8. The apparatus of claim 7, wherein the automated call menu is further configured to direct incoming calls to the plurality of agents having more than one different department.

9. The apparatus of claim 8, wherein the more than one different department includes respective departments associated with at least two of the following: technical support, account services department and sales.

10. The apparatus of claim 8, wherein the more than one different department includes some of the plurality of agents arranged within one or more levels of hierarchy.

11. A method comprising:
routing data, in the form of communications via a server and involving endpoint communication devices in a network, wherein each of the endpoint communication devices includes circuitry for communications over the Internet;
generating at least one call event indicative of changes in real-time status of a call;
generating a set of data metrics indicating at least one of real-time status of the call, of a caller and of the network using a first processing circuit that is communicatively coupled to the server;
evaluating the set of data metrics based on a set of criteria in a policy for the server using a second processing circuit that is communicatively coupled to the first processing circuit;
performing an action indicated in the set of criteria; and
providing an automated call menu including one or more menus of options for the caller using a third processing circuit that is communicatively coupled to the first and second processing circuits, wherein the automated call menu is configured to direct incoming calls to respective ones of more than one different department.

12. The method of claim 11, wherein the one or more menus of options are navigable by the caller to select from various actions.

13. The method of claim 11, wherein the one or more menus of options are navigable by the caller to select a destination to route the call.

14. The method of claim 11, further comprising escalating calls from the automated call menu to a call agent based on at least one of real-time status of the call, of the caller and of the network.

15. The method of claim 11, further comprising providing the automated call menu including a first menu map for a call center, and in response to the set of data metrics satisfying the set of criteria indicated in the policy, updating the automated call menu with a second menu map.

16. The method of claim 11, further comprising adjusting options provided to the caller by the automated call menu based on at least one of real-time status of the call, of the caller and of the network.

17. The method of claim 11, wherein for at least one of a plurality of servers:
a respective plurality of end users includes a plurality of agents logically arranged into a plurality of levels in a hierarchy specified in the policy; and
the automated call menu is configured to direct calls from a plurality of customers to the plurality of agents.

18. The method of claim 11, wherein the more than one different department includes departments respectively associated with technical support, account services and sales.

19. The method of claim 11, wherein the more than one different department includes some of a plurality of agents arranged within levels of hierarchy.

* * * * *